(12) United States Patent
Parkinson

(10) Patent No.: US 6,436,298 B1
(45) Date of Patent: Aug. 20, 2002

(54) APPARATUS AND METHOD FOR SEPARATING A MIXTURE OF A LESS DENSE LIQUID AND A MORE DENSE LIQUID

(75) Inventor: David John Parkinson, Bristol (GB)

(73) Assignee: Merpro Products LTD, Nailsea (GB)

( * ) Notice: Subject to any disclaimer, the term of this patent is extended or adjusted under 35 U.S.C. 154(b) by 0 days.

(21) Appl. No.: 09/463,284

(22) PCT Filed: Jun. 4, 1998

(86) PCT No.: PCT/GB98/01643

§ 371 (c)(1),
(2), (4) Date: May 25, 2000

(87) PCT Pub. No.: WO99/00169

PCT Pub. Date: Jan. 7, 1999

(30) Foreign Application Priority Data

Jun. 27, 1997 (EP) .............................................. 97304593

(51) Int. Cl.⁷ .................................................. C02F 1/38
(52) U.S. Cl. ........................ 210/744; 210/788; 210/789; 210/104

(58) Field of Search ................................. 210/744, 787, 210/788, 789, 104

(56) References Cited

U.S. PATENT DOCUMENTS 4,371,382 A * 2/1983 Ross
5,186,836 A * 2/1993 Gauthier et al.
5,827,357 A * 10/1998 Farion

* cited by examiner

*Primary Examiner*—Betsey Morrison Hoey
(74) *Attorney, Agent, or Firm*—Andrus, Sceales, Starke & Sawall, LLP

(57) ABSTRACT

A method and apparatus for providing a preliminary separation of production fluid. A vessel (1) has an annular inlet (5) opening upwardly at the bottom of the vessel. The inlet has means (4) for causing the mixture to swirl to generate a vortex. A first outlet (8) for an oil continuous flow is provided at the center of the annular inlet. A second outlet (10) for a water continuous phase is provided towards the bottom of the vessel and spaced from the first outlet. The oil and water are separated under centrifugal forces caused by the swirl and the oil is drawn down through the center of the vortex for discharge through the first outlet (8).

12 Claims, 2 Drawing Sheets

APPARATUS AND METHOD FOR SEPARATING A MIXTURE OF A LESS DENSE LIQUID AND A MORE DENSE LIQUID

BACKGROUND OF THE INVENTION

The present invention relates to an apparatus and method for separating a mixture of a less dense liquid component and a more dense liquid component. The invention can be applied to any such mixture, but is intended to have particular use for the field of separation of fluid from a well.

Conventionally, production fluid is initially separated in a three phase separator which is simply a large pressure vessel in which the production fluid is held for a sufficient residence time for oil, water and gas to separate out under gravity. Three phase separators are large to ensure a sufficient residence time for the separation to occur.

With the growing trend towards floating platforms, space can be more limited than on a conventional oil rig. In addition, the three phase separators have to be provided with complicated baffles in order to allow the liquid levels to be determined with any reasonable degree of accuracy and to inhibit remixing caused by waves within the separator as theloating platform is rocked by the sea.

As an alternative to three phase separators, it has been proposed to use hydrocyclones to perform an initial separation of production fluid. Although this enables the volume of the separator to be reduced, hydrocyclones have two significant problems when used in this way. Firstly, because they are set up to separate out a certain volumetric percentage of the input flow, they are unable to cope satisfactorily with slugs of oil and water and are also unable to adjust as the lifetime of the well progresses, with the inevitable increase of water and decrease of oil. Secondly, a hydrocyclone does not operate satisfactorily during phase inversion when the mixture is neither water continuous or oil continuous.

SUMMARY OF THE INVENTION

According to the present invention, an apparatus for separating a mixture of a less dense liquid component and a more dense liquid component comprises a vessel having a vertical axis, an annular inlet for the mixture in the bottom of the vessel and opening upwardly, the inlet being provided with means for causing the mixture to swirl about the vertical axis as it leaves the inlet, a first outlet at the centre of the annular inlet for the discharge of primarily the less dense liquid component which has been drawn down inside a vortex created by the swirling liquid, and a second outlet towards the bottom of the vessel and spaced from the first outlet for the discharge primarily of the more dense liquid component which has been forced away from the vertical axis of the vessel by the centrifugal forces of the swirling liquid.

Such an apparatus effectively offers all of the advantages of a three phase separator and a hydrocyclone. By swirling the mixture as it enters the vessel, the two liquids are forced to coalesce thereby speeding up separation. The centrifugal forces generated by the swirling mixture cause the less dense liquid to migrate towards the axis of the vessel and to be drawn down the centre of the vortex, while the more dense liquid is forced away from axis, where it may then separate further under gravity towards the bottom of the vessel. The time for separation to occur is therefore much less than in a three phase separator, so that the size of the separator can consequently be reduced.

The nature of the apparatus is that it sets up a layer of the less dense liquid above a layer of the more dense liquid, with the less dense liquid being drawn down through the more sense liquid at the centre of the vortex. This creates a short residence time within the vessel which is sufficient to accommodate any slugs in the mixture.

When the apparatus is used to separate production fluid, the natural pressure of this fluid can be used to generate the vortex, so that no pumps are necessary. The pressure drop which occurs across the inlet and outlets of the vessel means that choke valves which are conventionally necessary to reduce the pressure of the incoming producing fluid can now be set up to provide a smaller pressure drop. This reduces the amount of shear of the mixture and thus inhibits the emulsification of the mixture.

Preferably, control valves are provided on the two outlets, the valves being controlled in accordance with the quantities of the less dense liquid and the more dense liquid within the vessel to retain the levels of the two liquid components within predetermined ranges. Thus, either valve can be closed either partially or completely in response to a level of one or other liquid dropping below the predetermined range so that the level of the liquid in question can be increased. This means that the apparatus of the invention can be set up so that the composition of the two outlet streams is substantially constant throughout the lifetime of the well. The apparatus can thus accept a stream of production fluid of unknown and varying composition, and produce two streams of a known fixed composition which are in a continuous phase of one of the liquid components. Such streams can easily be separated further by hydrocyclones.

The amount of the two liquid components in the vessel can be determined by monitoring the make up of the mixture using a multi-phase monitor at the inlet. However, the simplest way of monitoring the amount of the two liquids is using level detectors to detect the level of the free surface of less dense liquid component and the level of the interface between the two liquid components.

If the vessel is a pressure vessel, the apparatus can additionally be used for the separation of gas by providing a third outlet for gas at the top of the vessel. A demisting device may be associated with the gas outlet to dry the gas as it leaves the vessel and return the liquid separated from the gas back to the main body of liquid in the vessel.

The arrangement of the annular inlet, the means for causing the mixture to swirl about the axis as it leaves the inlet, and the first outlet, may be provided by a device known as a tore which may be, for example, as described in WO 96/05128. The swirl may be caused by a motorised paddle system. However, it is preferable to make use of the pressure of the incoming liquid, by using an auger, or inclined vane system, or more preferably by the annular inlet being provided with a tangential or involute feed. It has been found that the shear of the fluid at the inlet can be kept to a minimum if two such tangential or involute inlets are provided diametrically opposed to one another.

A hollow cylindrical shield may be provided at the bottom of the vessel surrounding the annular inlet. This shield effectively reduces the volume of water which must be rotated by the incoming liquid and thus reduces the energy required to generate the vortex. It also serves to provide a region of relative calm at the lowermost and radially outermost region of the vessel so that the more dense liquid component can more readily separate out under gravity in this region.

If it is necessary to separate out any solids in the production fluid, a solid trap such as that disclosed in WO 95/07325 may be provided upstream of the vessel.

According to a second aspect of the invention a method of separating a mixture of a less dense liquid component and a more dense liquid component comprises the steps of introducing the mixture under pressure into a vessel through an annular inlet in the bottom of the vessel and which opens upwardly such that it swirls about a vertical axis and generates a vortex in which the less dense liquid component forms as a layer on top of the more dense liquid component and is also drawn down into the centre of the vortex; removing primarily the less dense liquid component through a first outlet at the centre of the annular inlet; and removing primarily the more dense liquid component through a second outlet from a region below the layer of the less dense liquid component.

The method may also comprise the steps of monitoring the quantities of the more dense and less dense liquid component in the vessel and controlling the outlet flow through the first and second outlets in order to maintain the levels of the two liquid components in the vessel at predetermined levels. In this case, the step of detecting the amounts of liquid components in the vessel preferably comprises detecting the level of the free liquid surface and detecting the level of the interface between the two liquid components.

BRIEF DESCRIPTION OF THE SEVERAL VIEWS OF THE DRAWINGS

An example of a method and apparatus in accordance with the present invention will now be described with reference to the accompanying drawings in which.

DETAILED DESCRIPTION OF THE INVENTION

Figure 1:
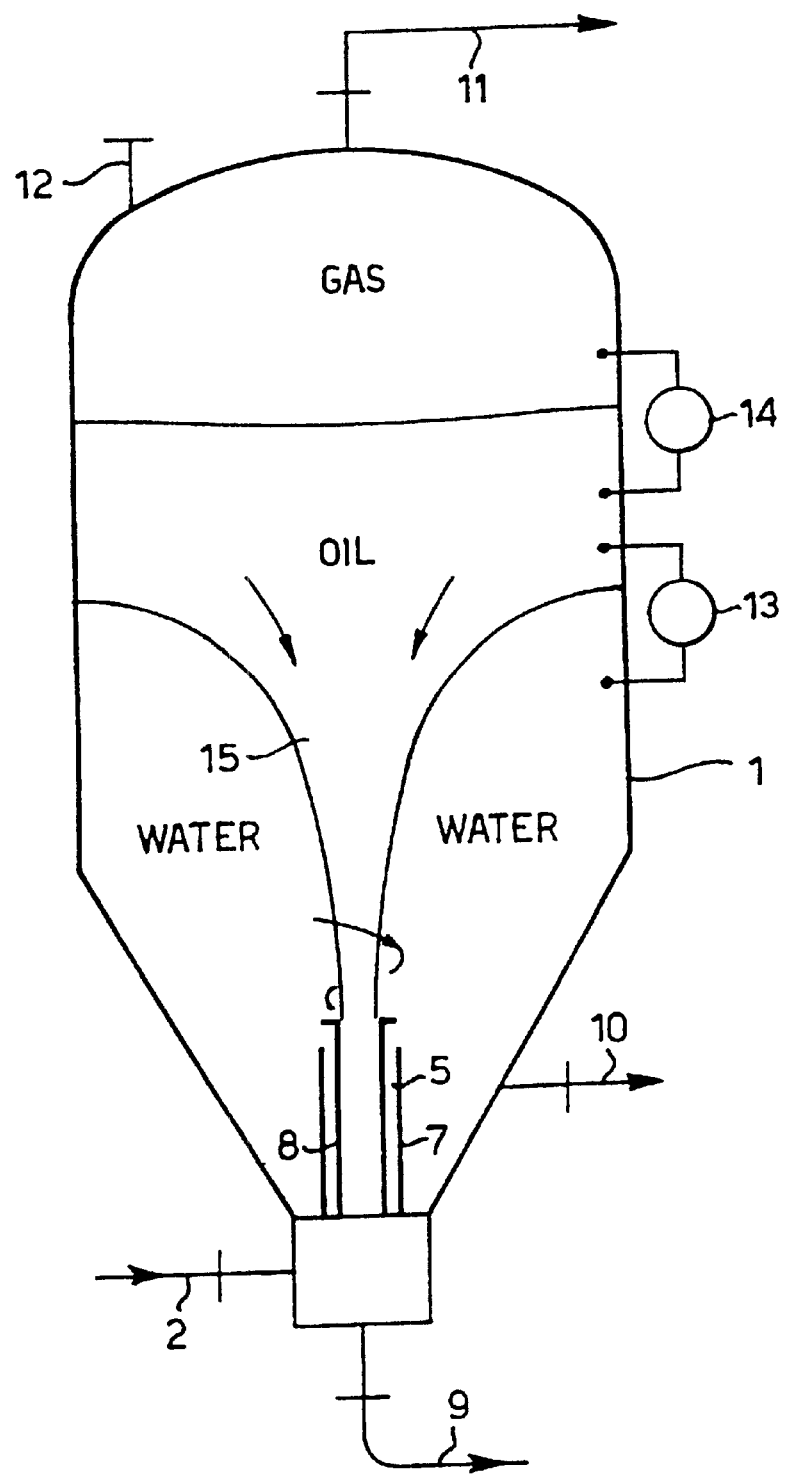
FIG. 1 is a schematic view of the apparatus.
Figure 2:
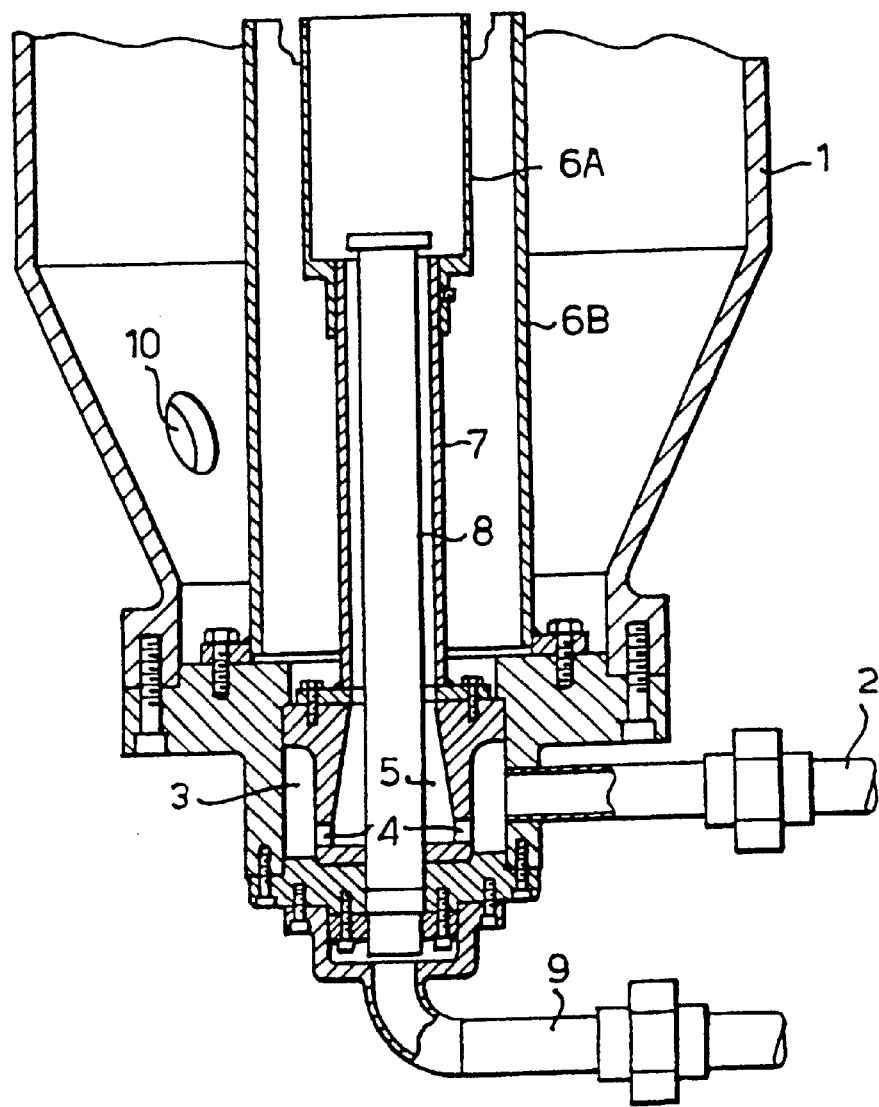
FIG. 2 is a cross section showing the detail at the lower part of the apparatus.

A pressure vessel 1 has a conical lower portion, a cylindrical mid-portion and a curved upper portion as shown in FIG. 1. A well fluid inlet 2 is provided at the bottom of the vessel 1. As will be seen from FIG. 2, the well fluid inlet 2 opens into an annular cavity 3 which leads via a pair of tangential inlets 4 into a second annular chamber 5. The annular chamber 5 extends upwardly around the centre of. the pressure vessel a substantial distance into the pressure vessel. A shield 6A, 6B may be provided either attached to the end of a fluid supply duct 7 forming the outer wall of the inlet chamber 5 as shown at 6A, or may be provided spaced from the fluid supply duct 7, and attached to the base of the vessel 1 as shown at 6B. Coaxially within the fluid supply duct 7 is a liquid discharge duct 8 which leads to a continuous oil phase outlet 9. A continuous water phase outlet 10 is provided in the wall of the vessel 1 towards the bottom of the vessel. A third outlet 11 for gas is provided at the top of the vessel, as is a pressure controller 12.

An interface level detector 13 of well known construction is provided to monitor the oil/water interface and a level indicator 14 of well known construction is provided to monitor the level of the free surface of oil.

In use, well fluids from a producing well are fed into the vessel 1 through well fluid inlet 2 at high pressure. As the fluids pass through the tangential inlets 4 they are caused to swirl. This swirl is maintained as the fluids leave the duct 7 in order to generate a vortex 15 within the vessel. The centrifugal forces cause the oil and water to coalesce, and to form a layer of oil above the water, and also cause the oil to be drawn down through the centre of the vortex and out through the liquid discharge duct 8. The water undergoes further gravity separation in the lower part of the vessel, and the water continuous phase is taken out through the continuous water phase outlet 10. At the same time, gas precipitates out of the oil and water and collects at the top of the vessel for removal through the gas outlet 11.

The interface level detector 13 and level detector 14 monitor the amounts of oil and water within the vessel and control valves (not shown) on the continuous oil phase outlet 9 and continuous water phase outlet 10 to ensure that the levels of oil and water remain within fixed parameters. Thus, if the amount of oil in the well fluid decreases, the level of the free surface of oil will drop, and this will be detected by the level detector 14. The level detector 14 will then cause a signal to be sent to the valve controlling the flow through the continuous oil phase outlet 9 thereby partially or completely closing this valve so that less oil is removed from the vessel allowing the free level of the oil to rise. A similar operation is conducted with the interface level detector 13 and a valve on the continuous water phase outlet 10 if the amount of water in the well fluid decreases.

What is claimed is:

1. An apparatus for separating a mixture of a less dense liquid component and a more dense liquid component comprising: a vessel (1) having a vertical axis, an annular inlet (5) for the mixture in the bottom of the vessel and opening upwardly, the inlet being provided with means (4) for causing the mixture to swirl about the vertical axis as it leaves the inlet, a first outlet (8) at the center of the annular inlet for the discharge of primarily the less dense liquid component which has been drawn down inside a vortex created by the swirling liquid, and a second outlet (10) towards the bottom of the vessel and spaced from the first outlet for the discharge primarily of the more dense liquid component which has been forced away from the vertical axis of the vessel by the centrifugal forces of the swirling liquid.

2. An apparatus according to claim 1, wherein control valves are provided on the two outlets, the valves being controlled in accordance with quantities of the less dense liquid and the more dense liquid within the vessel to retain levels of the two liquid components within predetermined ranges.

3. An apparatus according to claim 2, wherein level detectors (13, 14) are provided to detect a level of a free surface of the less dense liquid component and a level of an interface between the two liquid components.

4. An apparatus according to claim 1, wherein the vessel (1) is a pressure vessel and a gas outlet (11) is provided at the top of the vessel.

5. An apparatus according to claim 4, wherein a demisting device is associated with the gas outlet (11) to dry gas as it leaves the vessel (1) and return liquid separated from the gas back to a main body of liquid in the vessel.

6. An apparatus according to claim 1, wherein the swirl is caused by the annular inlet being provided with a tangential or involute feed (4).

7. An apparatus according to claim 6, wherein two tangential or involute inlets (4) are provided diametrically opposed to one another.

8. An apparatus according to claim 1, wherein a hollow cylindrical shield (6A,6B) is provided at the bottom of the vessel surrounding the annular inlet (5).

9. An apparatus according to claim 1, wherein level detectors (13, 14) are provided to detect a level of a free surface of the less dense liquid component and a level of an interface between the two liquid components.

10. A method of separating a mixture of a less dense liquid component and a more dense liquid component comprises the steps of introducing the mixture under pressure into a vessel (1) through an annular inlet (5) in the bottom of the vessel and which opens upwardly such that it swirls about a vertical axis and generates a vortex in which the less dense liquid component forms as a layer on top of the more dense liquid component and is also drawn down into the centre of the vortex; removing primarily the less dense liquid component through a first outlet (8) at the centre of the annular inlet; and removing primarily the more dense liquid component through a second outlet (10) from a region below the layer of the less dense liquid component.

11. A method according to claim 10, further comprising the steps of monitoring the quantities of the more dense and less dense liquid component in the vessel and controlling the outlet flow through the first (8) and second (10) outlets in order to maintain the levels of the two liquid components in the vessel at predetermined levels.

12. A method according to claim 11, wherein the step of monitoring the quantities of liquid components in the vessel comprises detecting a level of a free surface of the less dense liquid component and detecting a level of an interface between the two liquid components.

* * * * *